Patented Dec. 13, 1927.

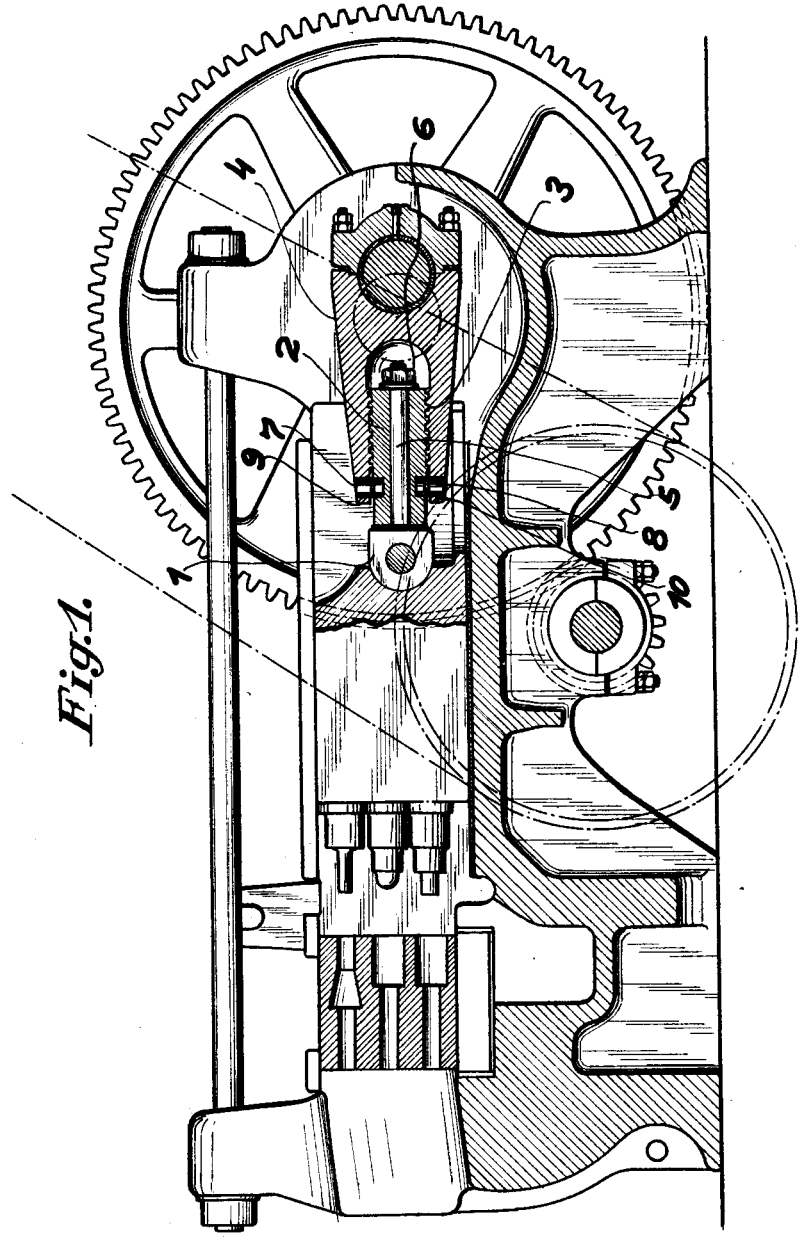

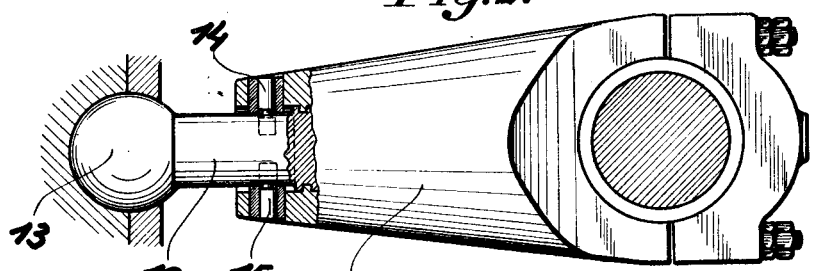
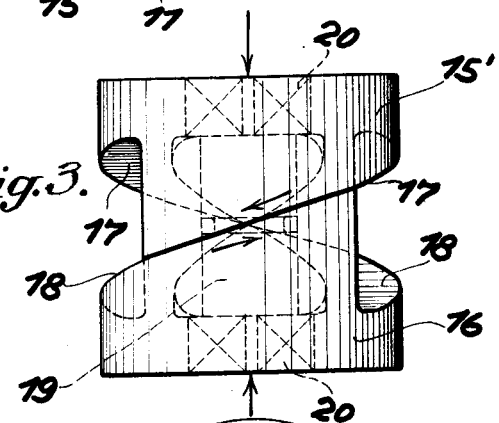
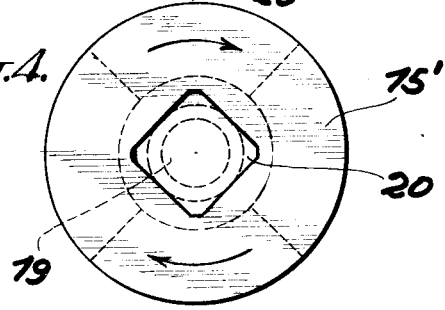

1,652,352

UNITED STATES PATENT OFFICE.

OTTO GEORG, OF DUSSELDORF, GERMANY.

RUPTURAL SAFETY MEANS.

Application filed July 27, 1926, Serial No. 125,216, and in Germany July 25, 1925.

This invention has reference to improvements in means for increasing the safety of connected parts of machinery against the effects of breaking, bending and deflecting strains, and it is one of the important objects of this invention to produce a considerable increase in the factor of safety without interfering with the working operation of the parts for various purposes and with the manufacture and usefulness of the apparatus and machinery produced from such material. In the case of heavy machine-tools, such as eccentric presses, forging machinery, cold-stroke-presses, roller works and the like, an absolutely unobjectionable means of protecting the heavy and expensive machine-body from the effects of breaking and distortion strains is indispensably necessary, inasmuch as the kind of the work to be performed frequently results in overstepping the maximum of the admissible pressure.

My invention provides a means whereby the connected parts of a machine are protected against injury under axially operating working pressure by the use of a helical surface adapted to convert axial pressure into a torque extending around the axis of pressure. The torque is then secured against excessive strains by the ordinary instrumentalities, such as detrusive or shearing studs, or any other suitable frangible, separable or releasing means.

The invention will be more particularly described with reference to the accompanying drawing, showing by way of exemplification certain embodiments of the principles of my invention, as applied to different kinds of machinery. Figure 1 illustrates a forging machine with a pressure-safety device according to this invention in vertical longitudinal section. Figure 2 illustrates the pressure rod of the machine on an enlarged scale and showing a modified construction. Figures 3 and 4 are side and end views of a safety device showing another modified construction.

In the form of construction according to Figure 1 the pressure rod of a crank-operated press (forging machine, fin removing press or the like) is built to operate as a safety pressure rod. The pivoting head 1 of the joint rests with its rear surface upon the spindle or shaft-surrounding sleeve 2 the steep screw threads of which engage with the pressure rod 4. For the backward movement the pivoting head 1 is connected by the spindle 5 and the screw nut 6 to the said spindle sleeve 2, but the shaft or spindle 5 may still be freely rotated in the spindle sleeve 2. The spindle sleeve 2 and the pressure rod 4 are secured against rotation with relation to each other by means of two shearing bolts 7 and 8 which are disposed in the bipartite shearing boxes 9 and 10 respectively. The bolts are so dimensioned and adjusted that they will be sheared off upon the overstepping of a certain pressure. When this occurs the spindle sleeve 2, being simultaneously rotated by the provision of the threads 3, is pushed into the pressure rod 4 and prevents the breaking of any of the parts subjected to pressure other than the bolts 7 and 8. In place of the shearing bolts I may also make use of a tearing bolt or of any equivalent frangible, separable or releasing means.

Figure 2 illustrates a modified construction which is particularly distinguished by the fact that the pressure spindle 12 is provided with a globular stud 13 and is directly screw-threadedly engaged within the pressure rod 11. By this means the separate spindle sleeve, used in the construction according to Figure 1, may be dispensed with. The securing of the parts is likewise effected by the shearing bolts 14 and 15.

Another modified construction is shown in Figures 3 and 4 of the drawing. Two rings 15' and 16 to be inserted into the pressure rod of the machine are superimposed and are in contact with each other along helical lines or surfaces 17 and 18 and in such a manner that upon the turning of the two rings with relation to each other the total length of the machine element becomes reduced. The twisting of the rings with relation to each other is prevented by means of a twisting bolt 19 which is retained in the outer portions of the two rings by a square head 20 on each side. The said bolt is weakened at its central part, and it is twistingly divided at the maximum torque or torsional strain. The cross section of the said bolt is so arranged that a certain predetermined torsional strain or torque, and consequently a predetermined axial pressure of the machinery, may be insured. This modification is particularly adapted for rolling-mill supports, but it may, of course, also be used in connection with other machinery.

In describing the use and construction of these various exemplifications of the principles of the invention I am not to be understood to exclude the use for other purposes or any other embodiments of the inventive principles which may find expression in various other modifications and changes, within the scope of the appended claims.

I claim:—

1. Safety device for connecting parts of machinery comprising members having helical engaging surfaces adapted to convert the axial pressure of one member into torsional pressure and torque about the other member, and securing means coupling said members and adapted to release the same under predetermined strain.

2. In a safety connector for driving and driven elements, a coupling connection between said elements pivotally coupled to one element and having a helical connection with the other element, and securing means between said connection and the latter-named element operative to release the same under a predetermined strain.

3. In a safety connector for the working parts of machinery, driving and driven elements, a member pivotally connected to one of said elements and coaxially arranged with respect to the other element, a second member coaxially mounted on the first-named member, said second member and the other of said elements having helical engaging surfaces, and securing means connecting the second-named member and second-named element and operative to release the same from connection under a predetermined strain.

4. In a safety connector for the working parts of machinery, a pressure rod, a shaft, a sleeve surrounding said shaft intermediate the same and the pressure rod and screw threadedly displaceable within said pressure rod, pivoting means at the outer end of said shaft, and safety means connecting the sleeve and the pressure rod, and adapted to release the same under a predetermined strain.

5. In a safety connector for the working parts of machinery, an axially recessed pressure rod, a shaft, a sleeve surrounding said shaft intermediate the same and the pressure rod and rotatable with relation to the shaft, said rod and sleeve having helical engaging portions, and safety means connecting the sleeve and pressure rod, and adapted to release the same under a predetermined strain.

6. In a safety connector for the working parts of machinery, a pressure rod, a rotary shaft in axial alinement with the rod, a helical connection between the rod and shaft, and securing means holding said connection from independent movement and adapted to be released under a predetermined strain.

In testimony whereof I affix my signature.

OTTO GEORG.